United States Patent [19]
Clay

[11] 3,723,702
[45] Mar. 27, 1973

[54] AUTOMATIC ASSEMBLING AND WELDING MACHINE

[75] Inventor: Howard W. Clay, Rockford, Ill.

[73] Assignee: Sterling Radiator Company, Inc., Rockford, Ill.

[22] Filed: Feb. 24, 1972

[21] Appl. No.: 228,908

[52] U.S. Cl. .................219/124, 219/79, 219/159, 228/48
[51] Int. Cl. ..............................................B23k 9/12
[58] Field of Search ............219/124, 125 R, 79, 159; 228/48, 49

[56] References Cited

UNITED STATES PATENTS

| 3,135,856 | 6/1964 | Stone | 219/124 |
| 3,553,418 | 1/1971 | Garver | 219/79 |

*Primary Examiner*—J. V. Truhe
*Assistant Examiner*—L. A. Schutzman
*Attorney*—Wolfe, Hubbard, Leydig, Voit & Osann

[57] ABSTRACT

The machine automatically inserts tubes one-by-one into holes spaced along a manifold pipe and, after insertion of each tube, welds the tube at right angles to the pipe.

7 Claims, 17 Drawing Figures

PATENTED MAR 27 1973

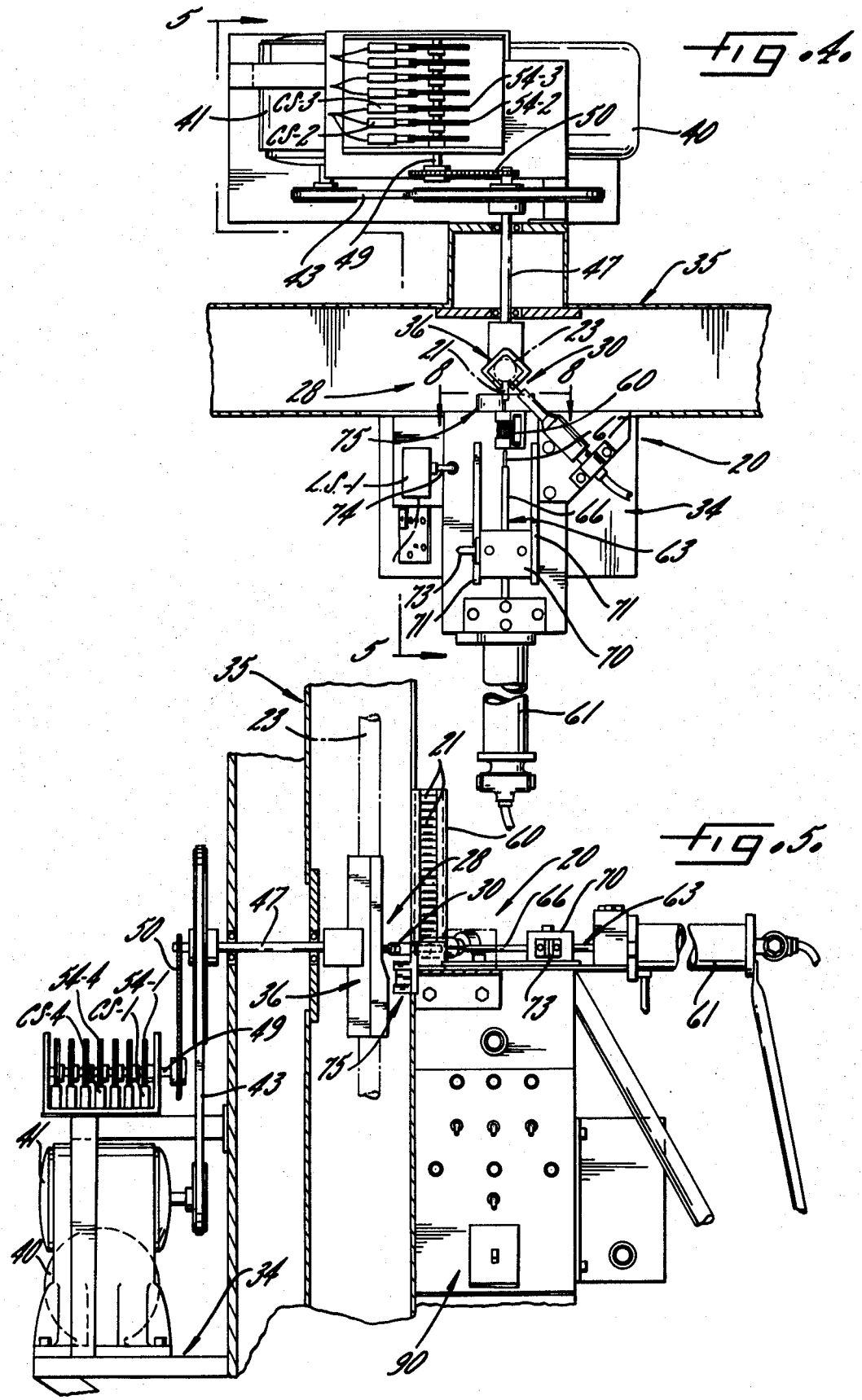

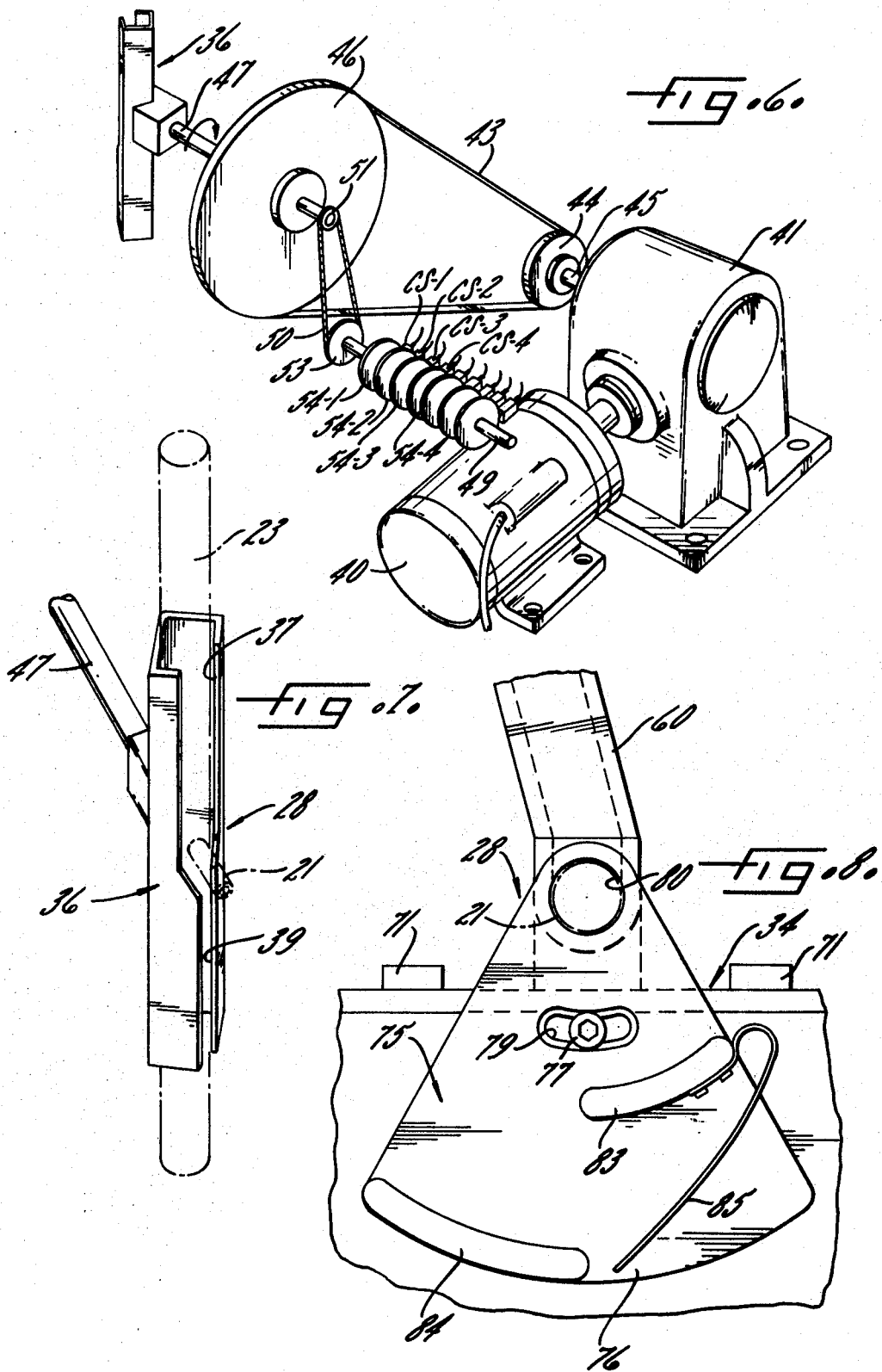

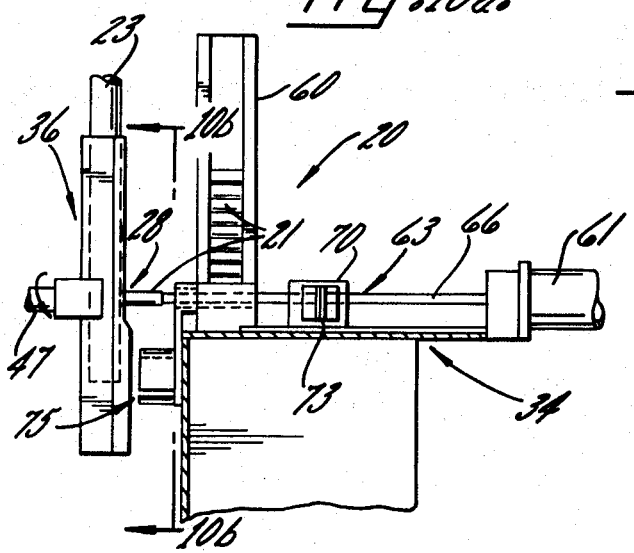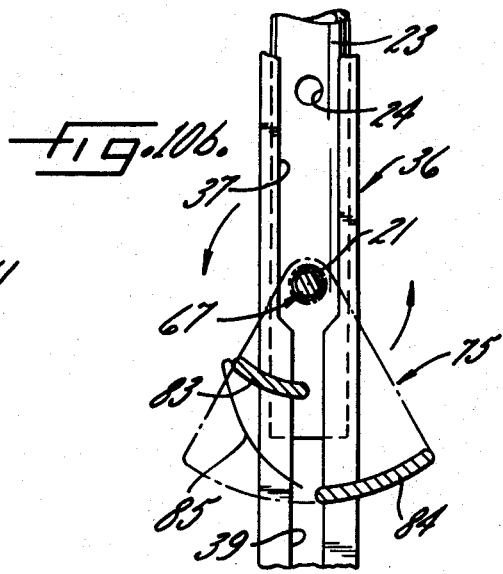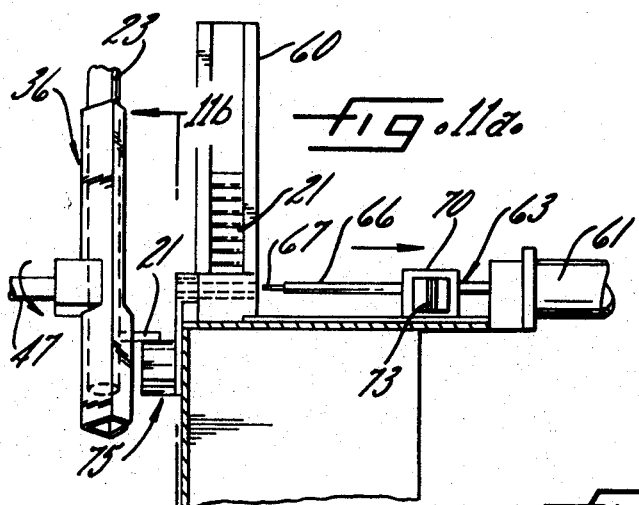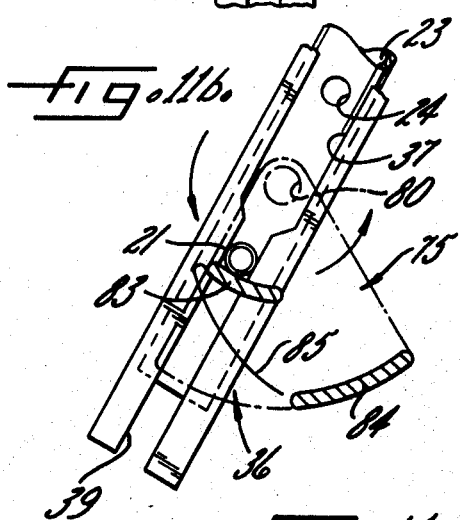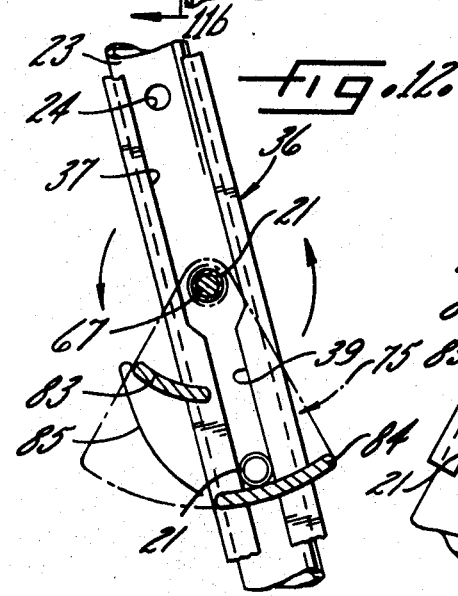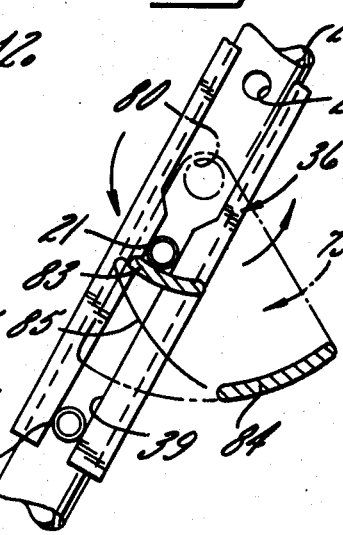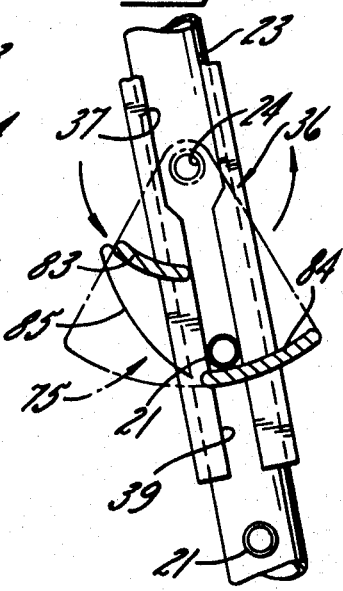

AUTOMATIC ASSEMBLING AND WELDING MACHINE

BACKGROUND OF THE INVENTION

This invention relates to the assembling and welding of projecting members, such as tubular rods, to an elongated workpiece at equally spaced locations along the workpiece and at substantially right angles to the workpiece.

SUMMARY OF THE INVENTION

The general aim of the present invention is to provide a new and improved machine which automatically delivers each rod into a welding station and into adjoining relation with the workpiece, establishes a tight weld around the joint between the rod and the workpiece, and then shifts the workpiece endwise into proper position to receive the next rod delivered to the welding station.

The invention also resides in unique mechanism for delivering the rods to the welding station, for rotating the workpiece during the welding operation, and for causing endwise shifting of the workpiece after the completion of each weld.

These and other objects and advantages of the invention will become more apparent from the following detailed description when taken in conjunction with the accompanying drawings.

BRIEF DESCRIPTION OF THE DRAWINGS

FIG. 4 is an enlarged fragmentary cross-section taken substantially along the line 4—4 of FIG. 3.

FIG. 5 is a fragmentary cross-section taken substantially along the line 5—5 of FIG. 4.

FIG. 6 is a perspective view of the drive train of the machine.

FIG. 7 is a perspective view of a fixture for holding the workpiece during the welding operation.

FIG. 8 is an enlarged fragmentary cross-section taken substantially along the line 8—8 of FIG. 4 and showing a catch for permitting periodic endwise shifting of the workpiece in the fixture.

FIGS. 10a and 10b are schematic views showing one step of the welding operation, FIG. 10b being taken substantially along the line 10b–10b of FIG. 10a.

FIGS. 11a and 11b are views similar to FIGS. 10a and 10b, respectively, but showing another step of the welding operation, FIG. 11b being taken substantially along the line 11b–11b of FIG. 11a.

FIGS. 12, 13 and 14 are views similar to FIGS. 10b and 11b but showing succeeding steps of the welding operation.

DETAILED DESCRIPTION OF THE PREFERRED EMBODIMENT

Figure 1:
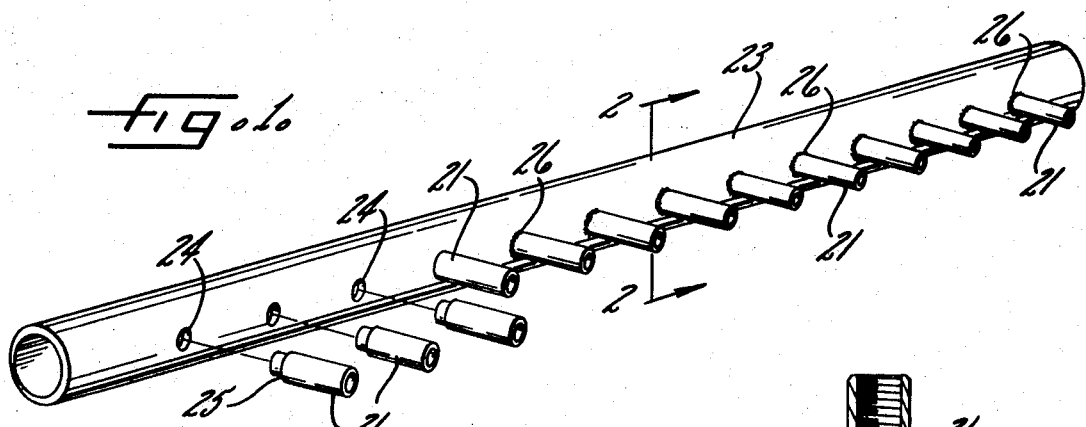
FIG. 1 is a perspective view of an exemplary workpiece to which the rods are assembled and welded.
Figure 2:
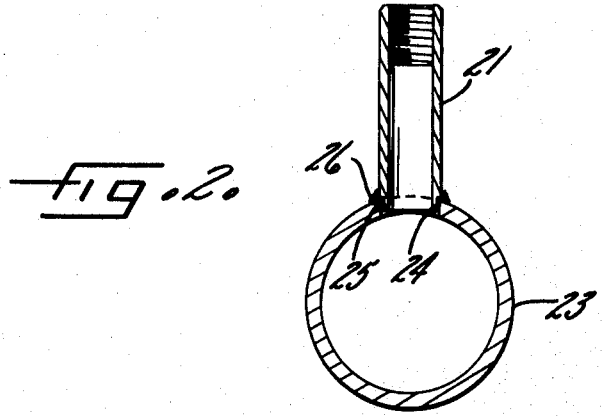
FIG. 2 is an enlarged cross-section taken along the line 2—2 of FIG. 1.
Figure 3:
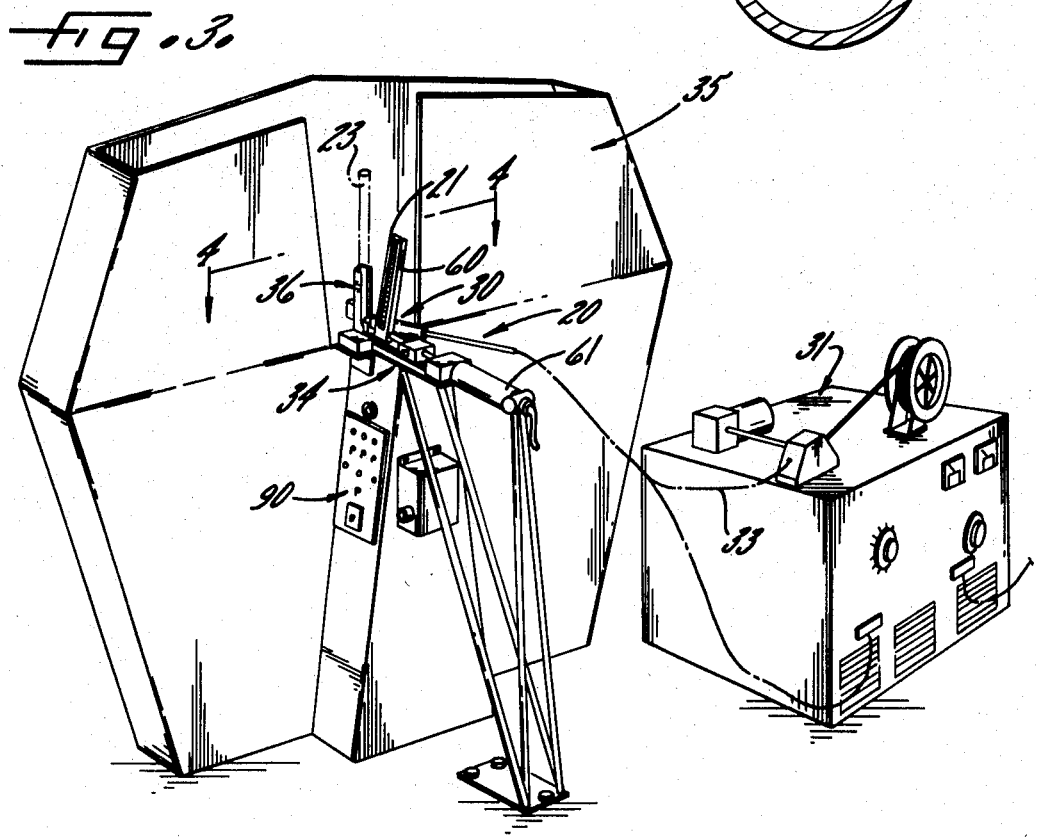
FIG. 3 is a perspective view of a new and improved automatic assembling and welding machine embodying the novel features of the present invention.

The present invention contemplates the provision of a machine 20 (FIG. 3) for automatically assembling projecting rod-like members 21 (FIG. 1) at spaced locations along an elongated workpiece 23 and for welding the members at substantially right angles to the workpiece. In this particular instance, the workpiece 23 is a gas manifold pipe while the projecting members 21 are generally cylindrical tubes, commonly called spuds, which support orifices (not shown) adapted to be threaded into the outer ends of the tubes. As shown in FIGS. 1 and 2, the inner end portions of the tubes 21 are necked down and are telescoped into holes 24 spaced along the pipe 23, a shoulder 25 on each tube abutting the outer side of the pipe. A gas-tight seal is established between each tube and the pipe by means of a ring-like weld 26 which encircles the tube adjacent the shoulder.

In general, the novel machine 20 for assembling and welding the tubes 21 is adapted to hold the pipe 23 in a generally upright position with one of the holes 24 located in a welding station 28 (FIGS. 4 and 5) where a tube is automatically inserted into the hole. Thereafter, the pipe and the tube are rotated about the axis of the tube to move the tube past an electric welding gun 30 in the welding station 28 and cause formation of the weld 26 around the joint between the tube and the pipe. After the welding operation is completed, the tube in the welding station is dropped downwardly through a distance equal to the spacing between the holes 24 and then is caught so that the pipe thus is lowered endwise through one step to position the next hole in the welding station preparatory to assembly and welding of the next tube.

The welding gun 30 is of conventional construction and is energized from a power unit 31 (FIG 3) which also feeds flexible welding rod 33 to the gun, the tip of the gun being located directly adjacent the joint between the pipe 23 and each tube 21 inserted into the pipe at the welding station 28. The gun is mounted rigidly and in a stationary position on the machine main support or frame which has been indicated in its entirety by the reference numeral 34. Attached to the frame 34 is a large sheet metal housing 35 within which the pipe 23 is rotated during the welding and which serves to keep the operator of the machine from inadvertently moving into the path of the rotating pipe.

To rotate the pipe 23, a pipe holder or fixture 36 (FIGS. 5 and 7) is rotatably supported within the housing 35 and is shaped such that the pipe can be inserted endwise into the fixture. As shown in FIGS. 5 and 7, the fixture comprises an elongated sleeve of generally rectangular cross-section and disposed in an upright plane with two of the diametrically opposite corners of the sleeve facing forwardly and rearwardly. A comparatively wide slot 37 is formed in the forward corner of the sleeve 36 and extends from one end of the sleeve to approximately the midpoint thereof while a narrower slot 39 joins the wide slot and extends to the other end of the sleeve. The wide slot 37 enables the tubes 21 to be delivered through the sleeve 36 and inserted into the holes 24 in the pipe 23 and the narrow slot 39 receives the tubes after the latter have been welded and the pipe has been shifted downwardly.

Rotation of the sleeve 36 is effected by an electric motor 40 (FIGS. 4 to 6) mounted on the rear portion of the frame 34 and acting through a speed reducer 41 to drive an endless belt 43. The latter is trained around a small pulley 44 (FIG. 6) on the output shaft 45 of the speed reducer and around a larger pulley 46 on the rear end of a horizontal shaft 47 extending through and journaled in the rear wall of the housing 35 and connected rigidly at its forward end to the sleeve 36. Each time the sleeve is rotated through two revolutions by the shaft 47, a cycle shaft 49 (FIGS. 4 to 6) for controlling operation of the machine 20 is rotated through one revolution. The cycle shaft is journaled on the rear portion of the frame 34 and is connected to the shaft 47 by a chain 50 which extends around a small sprocket 51 on the shaft 47 and a larger sprocket 53 on the cycle shaft. Several cams 54-1, 54-2, 54-3, 54-4, etc. (FIG. 7) are rotatable with the cycle shaft and serve to periodically open and close associated switches CS-1, CS-2, CS-3, CS-4, etc. whose functions will be explained subsequently.

Figure 9:
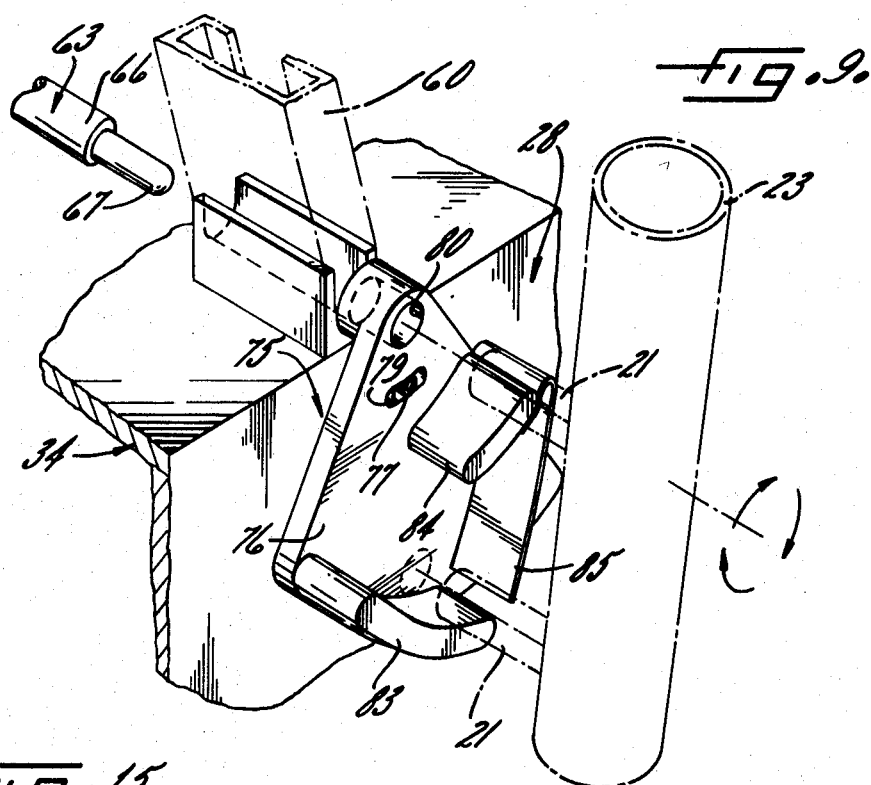
FIG. 9 is a perspective view of the catch shown in FIG. 8.

The tubes 21 initially are stacked vertically in side-by-side relation in an upright magazine 60 (FIG. 4) on the forward side of the frame 34 and are adapted to be fed one-by-one to the welding station 28 and inserted into the holes 24 in the pipe 23. To strip the tubes from the magazine and insert the tubes into the holes 24, an air cylinder 61 is anchored to the extreme forward side of the frame 34 and serves to reciprocate a horizontal plunger 63 inwardly and outwardly as pressurized air is alternately admitted into and dumped from opposite ends of the cylinder under the control of a valve 64 (FIG. 15) adapted to be shifted in response to energization and de-energization of a solenoid SOL-1. The plunger 63 is directly in line with the shaft 47 and the lower end of the magazine 60 and is formed by an elongated rod 65 and by a reduced diameter spindle 66 which is rotatably supported on the free end of the rod (see FIG. 9). As the plunger 63 is shifted inwardly, the spindle 67 telescopes into the lowermost tube 21 in the magazine 60 and such tube is then stripped from the magazine and pushed inwardly into the waiting hole 24 in the welding station 28 as the end of the rod 66 abuts against the outer end of the tube. The next tube in the magazine simply rests on the plunger until the latter is subsequently retracted to allow the tube to drop to the bottom of the magazine preparatory to being picked up by the rod 66 on the next inward stroke of the plunger.

Anchored to the plunger 63 is a block 70 (FIG. 4) which is fitted between a pair of rails 71 on the frame 34 and which serves to guide and support the plunger during its inward and outward movement. A dog 73 is carried on the block and engages the actuator 74 of a limit switch LS-1 to close the latter when the plunger has moved inwardly sufficiently far to seat the tube 21 on the spindle 67 into the hole 24 positioned in the welding station 28.

To stop the pipe 23 when the latter is lowered in the sleeve 36 after completion of the welding of each tube 21, a catch 75 (FIGS. 8 and 9) is supported on the frame 34 just below the welding station 28. The catch comprises a vertical plate 76 located between the sleeve 36 and the lower end of the magazine 60 and fastened to the frame 34 by a screw 77 which extends through an arcuate slot 79 in the plate to enable selective adjustment of the angular position of the plate. A hole 80 is formed in the upper end portion of the plate 76 and receives and guides each tube as the latter is moved from the lower end of the magazine 60 and into the hole 24 in the pipe 23.

Located on the side of the catch plate 76 facing the sleeve 36 are two angularly and vertically spaced abutments 83 and 84 (FIGS. 8 and 9) whose upper and lower surfaces are curved arcuately about the axis of rotation of each tube 21 in the welding station 28, such axis coinciding with the axes of the shaft 47 and the plunger 63. The abutments are located substantially on opposite sides of a vertical plane containing the rotational axis, and the upper abutment 83 is located ahead of the lower abutment 84 with respect to the direction of rotation of the pipe. For a purpose to be explained subsequently, a leaf spring 85 is cantilevered on the lower surface of one end of the upper abutment 83 and extends downwardly toward the corresponding end of the lower abutment 84.

Figure 15:
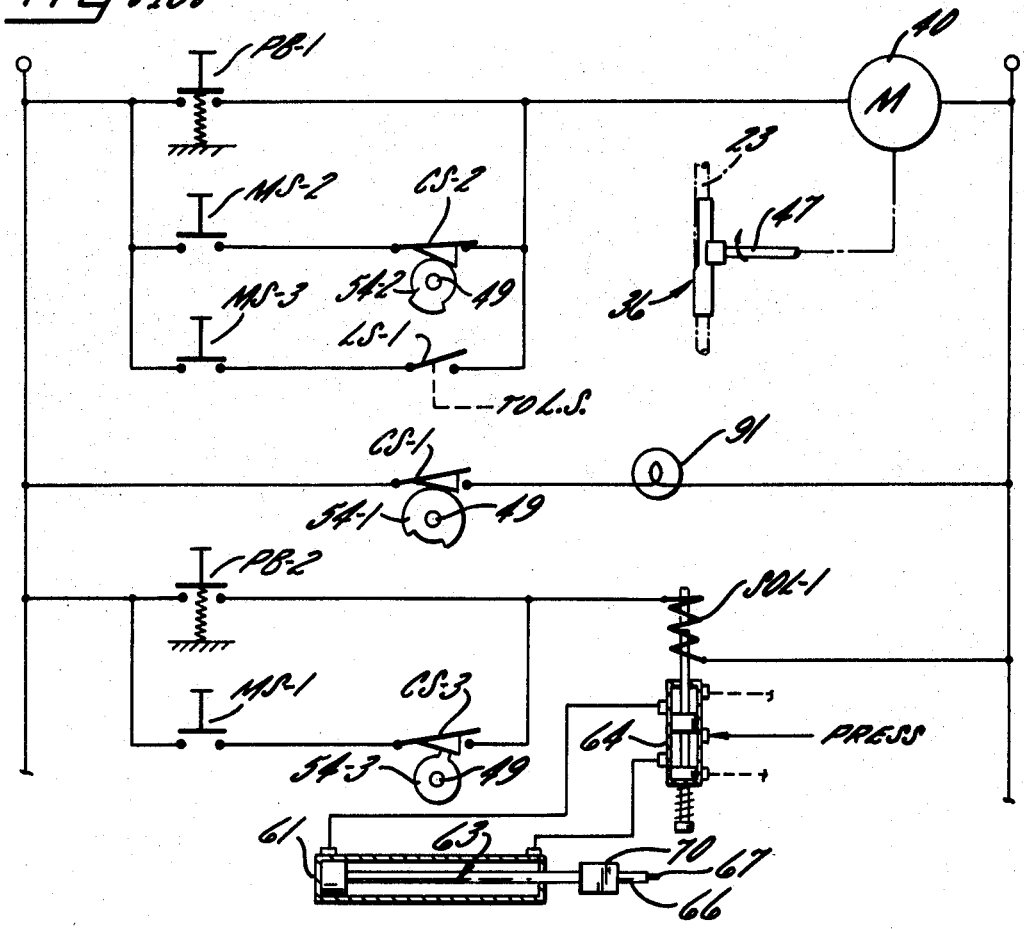
FIG. 15 is a diagram of the control circuit for the machine.

Now that most of the elements of the machine 20 have been described, it will be appropriate to describe the operational steps which are followed to weld the tubes 21 to the pipe 23. Prior to the start of the first cycle of a days operation, the plunger 63 is in its retracted position shown in FIGS. 4 and 11a and the control circuit of the machine 20 is conditioned as shown in FIG. 15 except that the cam switches CS-1, CS-2, CS-3 may be conditioned differently than shown. That is, the condition of the cam switches prior to the start of the first cycle depends upon the angular position in which the cycle shaft 49 was last stopped and thus any of these switches might be either opened or closed when the operator first begins to run the machine.

First, the operator depresses and closes a spring-loaded push button switch PB-1 from a control panel 90 (FIG. 3) on the frame 34 so as to energize the motor 40 and rotate the sleeve 36 and the cycle shaft 49. The operator releases and opens the push button switch PB-1 once an indicating light 91 (FIG. 15) on the control panel has been energized as a result of the cam 54-1 on the cycle shaft causing closure of the associated switch CS-1. When the indicator light comes on, the cycle shaft 49 is in the proper angular position for the start of a cycle and, in this position of the cycle shaft, the cams 54-2 and 54-3 cause the switches CS-2 and CS-3 to be closed. When the cycle shaft is stopped in this position, the sleeve 36 is oriented in a generally upright position with the wide slot 37 in the sleeve located above the narrow slot 39 (see FIG. 10b).

With the sleeve 36 thus positioned, the operator manually lowers the pipe 23 endwise into the sleeve and holds the pipe in such a position that the first or lowermost hole 24 in the pipe is alined vertically and angularly with the plunger 63. While holding the pipe with one hand, the operator depresses and closes a spring-loaded push button switch PB-2 (FIG. 15) with his other hand. Closure of the switch PB-2 energizes the solenoid SOL-1 to shift the valve 64 to a position causing the plunger 63 to shift inwardly.

As the plunger 63 shifts inwardly, the spindle 67 telescopes into the lowermost tube 21 in the magazine 60 and then the end of the rod 66 engages the outer end of the tube and pushes the latter out of the magazine, through the wide slot 37 in the sleeve 36 and then into the alined hole 24 in the pipe 23 (see FIGS. 10a & 10b). As the tube seats in the hole, the dog 73 on the plunger 63 engages the switch operator 74 and closes the limit switch LS–1.

Once the tube 21 has been seated in the hole 24, the tube and the telescoped spindle 67 prevent the pipe 23 from both shifting downwardly and turning about its own axis. Thus, the operator may release his one hand from the pipe and, while keeping the push button switch PB–2 depressed with his other hand, may use his free hand to close manually operable switches MS–1, MS–2 and MS–3 (FIG. 15). Once these switches have been closed, the machine 20 is conditioned for automatic operation and the operator may release the push button switch PB–2.

Closure of the manual switch MS–1 maintains the circuit to the solenoid SOL–1 through the closed cam switch CS–3 and thus the solenoid remains energized and the plunger 63 remains in when the push button switch PB–2 is manually released and opened. Closure of the manual switch MS–3 causes energization of the motor 40 through the closed limit switch LS–1 while closure of the manual switch MS–2 sets up an additional circuit to the motor through the closed cam switch CS–2. Once the motor has been energized, the cycle shaft 49 begins to rotate and, at the same time, the shaft 47 rotates the sleeve 36 to turn the pipe about the axis of the tube 21.

Shortly after the cycle shaft 49 begins to rotate, the cam 54–4 closes the switch CS–4 to energize the welding gun 30, the switch CS–4 being connected into the control circuit (not shown) of the welding unit 31. The tip of the welding gun thus spot welds the tube 21 to the pipe 23 and, once the spot weld has been formed, the tube itself is rotated about its own axis by virtue of being connected to the rotating pipe by the spot weld. The tube may either rotate on the spindle 67 or, if the spindle is telescoped rather tightly in the tube, the spindle may rotate relative to the rod 66 to permit turning of the tube.

As the pipe 23 rotates and causes the tube 21 to turn about its own axis, every point of the joint between the tube and the pipe is moved in a circular path and is swept past the tip of the welding gun 30. Thus, the ringlike weld 26 is formed around the tube at the joint as the latter is turned past the welding gun. The welding gun is kept energized for a period of time somewhat longer than required for the pipe to rotate through one revolution so as to insure that the weld will extend completely around the tube and that the weld in fact will overlap itself by a short angular distance of about 15°. A short time after the pipe starts rotating through its second revolution, the welding gun is de-energized automatically by virtue of the cam 54–4 permitting the cam switch CS–4 to open.

As the pipe 23 nears the end of its second revolution and the cycle shaft 49 nears the end of its first revolution, the cam 54–3 causes the cam switch CS–3 to open and thereby de-energize the solenoid SOL–1 and effect retraction of the plunger 63 (see FIG. 11a). The spindle 67 thus is pulled out of the tube 21 as the pipe approaches an upright position and as the sleeve 36 becomes oriented such that the wide slot 37 is positioned above the narrow slot 39. As the spindle is retracted, the dog 73 moves away from the switch operator 74 to open the limit switch LS–1 but the motor 40 remains energized by way of the holding circuit established through the cam switch CS–2 and the switch MS–2. The pipe 23 thus continues to rotate for a period of time after the spindle 67 has been pulled out of the welded tube 21.

Once the spindle 67 has been pulled out of the welded tube 21, the pipe 23 is free to slide downwardly in the sleeve 36. Thus, as the sleeve approaches an upright position, the pipe slides downwardly to cause the welded tube 21 to shift downwardly into the narrow slot 39 and then to engage the upper abutment 83 of the catch 75. (see FIG. 11b) Engagement of the welded tube 21 with the upper abutment 83 causes a momentary delay in the downward shifting of the pipe but, with continued rotation of the pipe, the welded tube rides off of the upper abutment and permits the pipe to shift further downwardly in the sleeve until the welded tube engages the lower abutment 84 (see FIG. 12). When the welded tube 21 is in engagement with the lower abutment 84, the pipe is positioned with the hole 23 immediately above the tube (i.e., the second hole in the pipe) disposed in alinement with the path of the plunger 63 and located so as to receive the next tube delivered by the plunger.

At about the same time the welded tube 21 rides off of the upper abutment 83, the cam 54–3 causes the cam switch CS–3 to re-close so as to energize the solenoid SOL–1 and start the plunger 63 through its inward stroke. Immediately after the plunger starts inwardly and while the welded tube 21 is located on the lower abutment 84, the cam 54–2 causes the switch CS–2 to open thereby to de-energize the motor 40 and terminate rotation of the pipe 23. Rotation of the pipe 23 thus is stopped when the welded tube is in engagement with the lower abutment 84 and, by virtue of such engagement, the pipe is prevented from shifting downwardly in the sleeve 36 and is held with the second hole 24 alined vertically with the path of the plunger 63. Also, the welded tube 21 engages the walls of the narrow slot 39 and holds the pipe such that the second hole 24 is alined angularly with the path of the plunger. Accordingly, upon continuing its inward shifting, the plunger 63 picks up the next tube 21 in the magazine 60 and inserts the tube into the second hole 24.

Once the second tube 21 has been seated in the second hole 24, the dog 73 on the plunger 63 closes the limit switch LS–1 to energize the motor 40 and initiate rotation of the pipe 23 and the cycle shaft 49. As the cycle shaft rotates, the cam 54–2 closes the cam switch CS–2 to establish a holding circuit which keeps the motor energized when the limit switch LS–1 is subsequently opened upon the next retraction of the plunger 63.

After rotation of the pipe 23 has been re-initiated, the welding gun 30 is again energized and serves to weld the second tube 21 to the pipe. As the pipe then nears the end of its second revolution of the second cycle and approaches an upright position, the cam switch CS–3 again opens to cause retraction of the plunger 63 and thereby leave the pipe free to slide downwardly in the sleeve 36. As the pipe shifts downwardly and the second tube 21 is caught by the upper abutment 83, the first or lowermost tube shifts downwardly to a position below the lower abutment 84 (see FIG. 13) and thus sweeps clear of the lower abutment when the pipe is rotated further to allow the second tube 21 to drop onto the lower abutment and thereby hold the pipe with the third hole 24 positioned in alinement with the plunger 63 when rotation of the pipe is stopped (see FIG. 14). The cycle then repeats with inward advancement of the plunger being followed by re-starting of the rotational movement of the pipe, welding of the third tube, retraction of the plunger and stopping rotation of the pipe.

In summary, each newly welded tube 21 rests on the lower abutment 84 while the pipe 23 is stopped and holds the pipe in the proper endwise position for insertion of the next tube into the hole 24 immediately above the abutment. The plunger 63 then maintains the pipe in the proper endwise position in the sleeve 36 during rotation of the pipe to weld the tube. That tube then drops onto the upper abutment 83 when the plunger is retracted and allows the pipe to shift downwardly sufficiently far for the lower tube to clear the lower abutment 84. Finally, the upper tube comes to rest on the lower abutment 83 to hold the pipe in position for insertion of still another tube. If the pipe should tend to stick in the sleeve 36 and gravity is ineffective to lower the upper tube onto the upper abutment 83, the lower tube will engage the cantilevered spring 85 and the latter will positively force the pipe downwardly so that the lower tube will clear the upper abutment and the upper tube will subsequently be lowered onto such abutment.

From the foregoing, it will be apparent that the present invention brings to the art a new and improved machine 20 for assembling and welding the tubes 21 to the pipe 23. Once the pipe has been loaded into the sleeve 36 and the first tube inserted into the first hole 24, the machine operates entirely automatically to assemble and weld the remaining tubes and the operator need only remove the completed assembly from the machine.

I claim as my invention:

1. A machine for assembling and welding projecting members to an elongated workpiece at spaced locations along and at substantially right angles to the workpiece, said machine comprising a support, a holder mounted on said support to turn about a preselected axis in a welding station and engageable with said workpiece to hold the latter in a plane disposed at substantially right angles to said axis, means on said support for periodically causing endwise shifting of the workpiece in said holder and within said plane, means operable in timed relation with shifting of the workpiece for feeding one of said projecting members into said welding station to a position in which such member is centered on said axis and adjoins said workpiece, a welder located in said welding station adjacent the joint between the workpiece and the projecting member in the welding station and operable to anchor such member to the workpiece, and mechanism for turning said holder to rotate the workpiece and the anchored projecting member about said axis and past said welder thereby to cause said welder to establish a weld around said joint.

2. A machine for assembling and welding projecting members to an elongated workpiece at spaced locations along and substantially at right angles to the workpiece, said machine comprising a support, a holder mounted on said support to turn about a generally horizontal axis in a welding station and engageable with said workpiece to retain the latter in an upright plane disposed substantially at right angles to said axis, means for delivering said projecting members one at a time along said axis and into said welding station to a position in which the delivered member is centered on said axis and adjoins said workpiece, a welder located in said welding station adjacent the joint between the workpiece and the projecting member in the welding station and operable to anchor such member to the workpiece, mechanism for turning said holder to rotate the workpiece and the anchored projecting member about said axis and past said welder thereby to cause the welder to establish a weld around said joint, and means operable after completion of said weld and as said workpiece is turned toward an upright position to shift the workpiece downwardly to a new position in said holder and thereafter to retain the workpiece in such position preparatory to the delivery of the next projecting member to said welding station.

3. A machine for inserting rods into holes spaced longitudinally along an elongated workpiece and for welding the rods to the workpiece at substantially right angles thereto, said machine comprising a support, a holder mounted on said support to turn about a generally horizontal axis in a welding station and engageable with said workpiece to retain the latter in an upright plane disposed generally at right angles to said axis, said holder preventing turning of the workpiece about its longitudinal centerline while permitting endwise shifting of the workpiece in said plane, a catch on said support beneath said welding station and operable to prevent endwise shifting of the workpiece when the latter is disposed in a generally upright position with one of said holes located in said welding station and centered on said axis, means on said support for holding a supply of said rods, a reciprocable plunger having a free end portion sized to telescope with said rods and periodically operable to deliver one of the rods along said axis and to insert the rod into the hole in the welding station in adjoining relationship with said workpiece, a welder located in said welding station adjacent the joint between the workpiece and the delivered rod and operable to anchor such rod to the workpiece, mechanism for turning the holder to rotate the workpiece and the anchored rod about said axis and past said welder thereby to cause the welder to establish a weld around said joint, said catch releasing said workpiece during welding of said joint but said plunger remaining telescoped with said anchored rod to prevent endwise shifting of the workpiece as the latter is rotated during such welding, and means for retracting said plunger from the welded rod after completion of said welding and as said workpiece approaches an upright position thereby to enable said workpiece to shift downwardly in said holder to place the newly welded rod onto said catch so as to present the next hole to the welding station while preventing downward shifting of the workpiece preparatory to the insertion of another rod into such hole.

4. A machine as defined in claim 3 in which said catch includes a lower abutment upon which a newly welded rod rests while another rod is being inserted into the next hole in the workpiece, an upper abutment on said support and spaced angularly about said axis from said lower abutment, said upper abutment being located ahead of said lower abutment with respect to the direction of rotation of said workpiece, each newly welded rod first dropping onto said upper abutment upon retraction of said plunger and then moving off of said upper abutment and dropping onto said lower abutment during continued rotation of the workpiece after retraction of the plunger.

5. A machine as defined in claim 4 further including means for automatically stopping rotation of said workpiece after said newly welded rod has been dropped onto said lower abutment and then re-starting rotation of said workpiece when said plunger inserts another rod into the next hole.

6. A machine as defined in claim 3 in which the free end portion of said plunger is supported to rotate about said axis and is free to turn with the telescoped rod during welding of the latter.

7. A machine as defined in claim 3 in which said rods are tubular, said plunger being sized and shaped to telescope into the rods and press the latter against the workpiece during welding of the rods.

* * * * *